United States Patent
Suda et al.

(10) Patent No.: US 7,556,877 B2
(45) Date of Patent: Jul. 7, 2009

(54) DIRECT METHANOL FUEL CELL

(75) Inventors: Yoshihisa Suda, Gunma (JP); Takahiro Osada, Gunma (JP); Kunitaka Yamada, Gunma (JP)

(73) Assignee: Mitsubishi Pencil Kabushiki Kaisha, Shinagawa-Ku, Tokyo (JP)

( * ) Notice: Subject to any disclaimer, the term of this patent is extended or adjusted under 35 U.S.C. 154(b) by 416 days.

(21) Appl. No.: 10/624,840

(22) Filed: Jul. 23, 2003

(65) Prior Publication Data

US 2004/0126646 A1 Jul. 1, 2004

(30) Foreign Application Priority Data

Jul. 26, 2002 (JP) ............... 2002-218320

(51) Int. Cl.
*H01M 8/04* (2006.01)
(52) U.S. Cl. ............... 429/34; 429/12; 429/44
(58) Field of Classification Search ............... None
See application file for complete search history.

(56) References Cited

U.S. PATENT DOCUMENTS 5,432,023 A * 7/1995 Yamada et al. ............... 429/34
2004/0155065 A1* 8/2004 Kinkelaar et al. ........... 222/187

FOREIGN PATENT DOCUMENTS

| JP | 59-066066 | | 4/1984 |
|---|---|---|---|
| JP | 01-132055 | A | 5/1989 |
| JP | 05-258760 | | 10/1993 |
| JP | 05-307970 | | 11/1993 |
| JP | 06-188008 | | 7/1994 |
| JP | 2001-093551 | * | 4/2001 |
| JP | 2001-093551 | A | 4/2001 |
| JP | 2001-102069 | | 4/2001 |
| JP | 2001-313047 | A | 11/2001 |
| JP | 2004-146265 | A | 5/2004 |

* cited by examiner

*Primary Examiner*—John S Maples
(74) *Attorney, Agent, or Firm*—Buchanan Ingersoll & Rooney PC

(57) ABSTRACT

A direct methanol fuel cell comprises a multiple number of connected unit cells, each composed of a fuel electrode element of a microporous carbon material, an electrolyte layer formed on the outer surface of the fuel electrode element, an air electrode layer formed on the outer surface of the electrolyte layer, wherein each unit cell is supplied with fuel from a fuel reservoir through a fuel feeder having an infiltration structure coupled therebetween.

7 Claims, 4 Drawing Sheets

FIG. 2
FIG. 3A
FIG. 3B
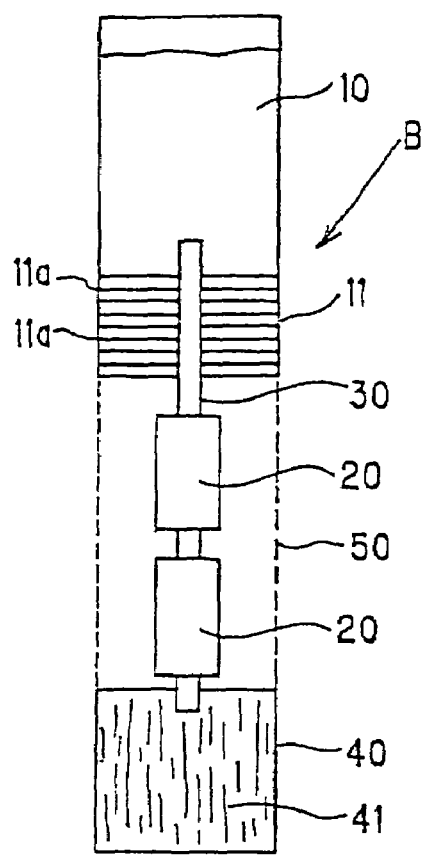
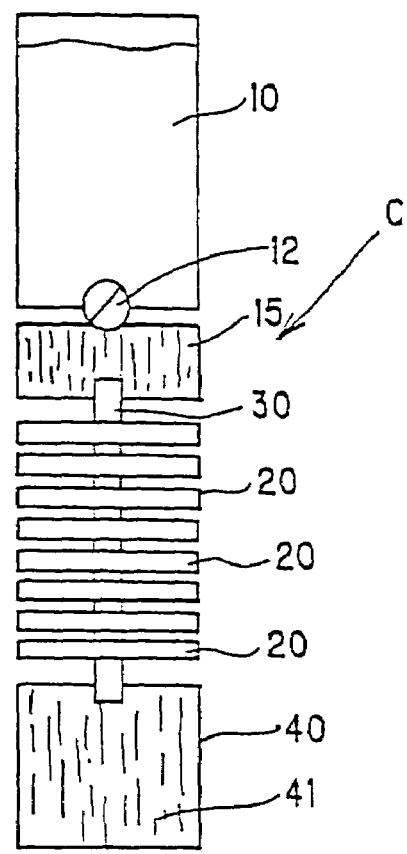
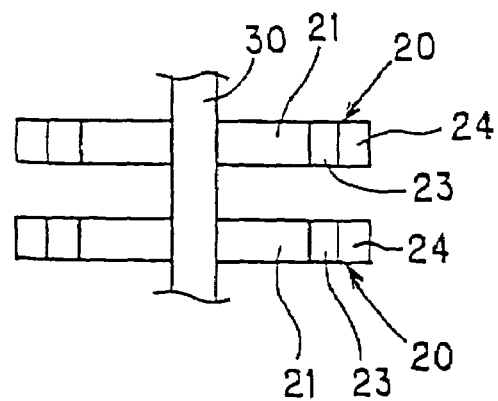

DIRECT METHANOL FUEL CELL

BACKGROUND OF THE INVENTION (1) Field of the Invention

The present invention relates to a direct methanol fuel cell, and more detailedly relates to a compact direct methanol fuel cell that is suitable for power sources of portable electric appliances such as cellular phones, laptop computers, and the like.

(2) Description of the Prior Art

Generally, a fuel cell is a battery which is comprised of a fuel cell unit made up of an air electrode layer, an electrolyte layer and a fuel electrode layer formed into layers, a fuel feeder for supplying fuel as a reducer to the fuel electrode layer, and an air feeder for supplying air as an oxidizer to the air electrode layer, and causes electrochemical reactions involving the fuel and oxygen in the air within the fuel cell unit, so as to produce electric power for an external circuit. Recently, various types of fuel cells have been developed.

Because of recent increase in awareness of environmental issues and energy saving, fuel cells as clean energy sources have been investigated for various purposes. In particular, direct methanol fuel cells, as disclosed in Japanese Patent Application Laid-open Hei 5 No. 258760, Japanese Patent Application Laid-open Hei 5 No. 307970, which are capable of generating electricity by direct supply of a liquid fuel containing methanol and water, have attracted a great deal of attention.

Of these, liquid fuel cells that utilize capillary action to supply a liquid fuel have been disclosed by Japanese Patent Application Laid-open Sho 59 No. 66066, Japanese Patent Application Laid-open Hei 6 No. 188008, and others.

Since these liquid fuel cells supply the liquid fuel from the fuel tank to the fuel pole by capillary force, no pump for pumping the liquid fuel is needed, resultantly producing an advantage for miniaturization. It is true that this type of liquid fuel cell which utilizes capillary force only is suitable for compact configurations, but has the following disadvantage. That is, since fuel is supplied in its free state to the fuel pole, a long period use of a portable appliance with a cell under the usage environment in which the cell unit is always moved back and forth and left and right or turned upside down, makes it impossible for the fuel to flow correctly, causing problems such as fuel supply deficiency, air bubble entrance to the tank, and the like, or inhibiting a fixed amount of fuel supply to the fuel rod.

As one of countermeasures against these defects, Japanese Patent Application Laid-open 2001-102069, for example, discloses a system in which liquid fuel, after it is introduced into the cell by capillary force, is used by evaporating it within a fuel vaporizing layer. However, this method still cannot solve the basic problem, i.e., the insufficient fuel followability problem. Further, because of use of fuel after its evaporation from liquid, the fuel cell of this configuration produces difficulties in miniaturization.

In this way, under the current situation, the conventional direct methanol fuel cells suffer the problem that the output power during operation may fluctuate due to instability of the fuel supply in supplying the liquid fuel directly to the fuel pole, and face difficulties in achieving the level of miniaturization needed to be built into a portable appliance whilst keeping stable characteristics.

SUMMARY OF THE INVENTION

With consideration to the problem and the current situation of the conventional direct methanol fuel cells, the present invention has been devised in order to solve the problems. It is therefore an object of the present invention to provide a direct methanol fuel cell which can directly supply liquid fuel to the fuel electrode in a stable manner and which can achieve miniaturization thereof.

The present inventors hereof have eagerly studied the above conventional problems, and resultantly have succeeded to obtain a direct methanol fuel cell aiming at the above purpose, the fuel cell including a plurality of unit cells of a fuel electrode element constituted of a microporous carbon material, an electrolyte layer on the outer surface of the fuel electrode and an air electrode layer on the outer surface of the electrolyte layer, wherein a fuel feeder of a specific structure that is directly connected to a fuel reservoir is joined to each unit cell to supply fuel, and herein have completed the present invention.

The present invention is configured as follows:

In accordance with the first aspect of the present invention, a direct methanol fuel cell including a multiple number of connected unit cells, each composed of a fuel electrode element of a microporous carbon material, an electrolyte layer formed on the outer surface of the fuel electrode element, an air electrode layer formed on the outer surface of the electrolyte layer, is characterized in that each unit cell is connected to a fuel feeder having an infiltration structure and coupled with a fuel reservoir for storing liquid fuel, so as to supply liquid fuel thereto.

In accordance with the second aspect of the present invention, the direct methanol fuel cell having the above first feature is characterized in that the terminal end of the fuel feeder is connected to a spent fuel reservoir.

In accordance with the third aspect of the present invention, the direct methanol fuel cell having the above first feature is characterized in that the fuel reservoir is constructed of a replaceable cartridge structure.

In accordance with the fourth aspect of the present invention, the direct methanol fuel cell having the above first feature is characterized in that the fuel supply system for supplying liquid fuel from the fuel reservoir to the fuel feeder includes an valve element and/or a collector element.

In accordance with the fifth aspect of the present invention, the direct methanol fuel cell having the above first feature is characterized in that the fuel electrode element and the fuel feeder adjoining the fuel electrode element are formed of a porous material and/or bundled fibers presenting capillarity.

In accordance with the sixth aspect of the present invention, the direct methanol fuel cell having the above fifth feature is characterized in that the fuel electrode element provides the function of a fuel feeder.

In accordance with the seventh aspect of the present invention, the direct methanol fuel cell having the above second feature is characterized in that the fuel feeder is arranged from the fuel reservoir to the spent fuel reservoir, and the magnitudes of capillarity of the fuel reservoir, the fuel electrode element and/or fuel feeder adjoining the fuel electrode element and the spent fuel reservoir are selected so that the fuel reservoir<the fuel electrode element and/or fuel feeder adjoining the fuel electrode element<the spent fuel reservoir.

In accordance with the eighth aspect of the present invention, the direct methanol fuel cell having the above first feature is characterized in that the microporous carbon material is a carbon composite forming which is made up of amorphous carbon and powdery carbon, having micro continuous pores.

In accordance with the ninth aspect of the present invention, the direct methanol fuel cell having the above eighth feature is characterized in that the powdery carbon is composed of, at least, one selected from the group of highly ordered pyrolytic graphite (HOPG), kish graphite, natural graphite, artificial graphite, carbon nanotubes and fullerenes.

BRIEF DESCRIPTION OF THE DRAWINGS

FIG. 2 is a schematic sectional view showing a vertical section of the second embodiment of the present invention;

FIG. 3A is a schematic sectional view showing a vertical section of the third embodiment of the present invention and FIG. 3B is a partial vertical sectional view showing essential parts of a unit fuel cell;

DESCRIPTION OF THE PREFERRED EMBODIMENTS

The embodiment of the present invention will hereinafter be described in detail with reference to the accompanying drawings.

Figure 1A:
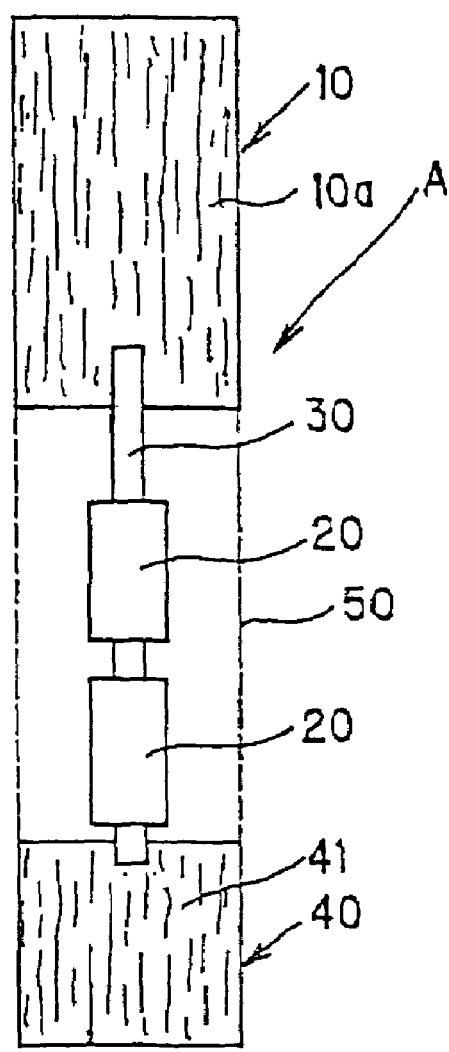
FIG. 1A is a schematic sectional view showing a vertical section of the first embodiment of the present invention.
Figure 1B:
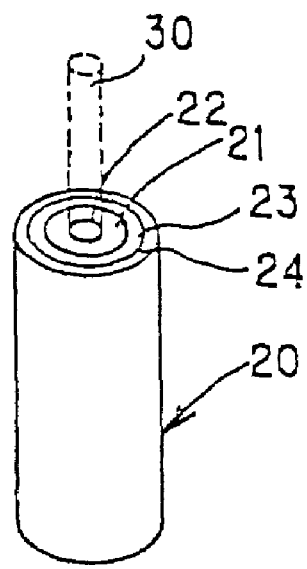
FIG. 1B is a perspective view of a unit fuel cell and FIG. 1C is a vertical section of the unit fuel cell.
Figure 1C:
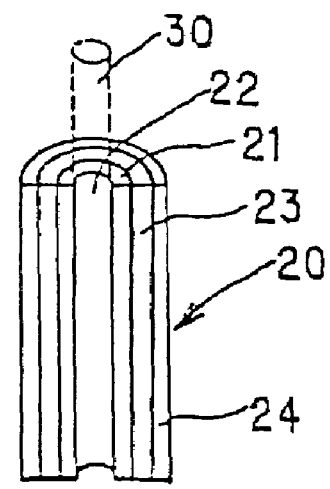

FIGS. 1A to 1C shows a basic structure of a direct methanol fuel cell (to be referred to simply as 'fuel cell' hereinbelow) A in the first embodiment of the present invention.

This fuel cell A, as shown in FIGS. 1A to 1C, includes a fuel reservoir 10 for storing liquid fuel, unit cells (fuel cell units) 20, 20, each comprised of a fuel electrode element 21 of a microporous carbon material, an electrolyte layer 23 formed on the outer surface of the fuel electrode element and an air electrode layer 24 formed on the outer surface of the electrolyte layer 23, a fuel feeder 30 connected to the fuel reservoir 10 and having an infiltration structure, and a spent fuel reservoir 40 disposed at the bottom of the fuel feeder 30. The aforementioned unit cells 20, 20 are coupled in series with fuel feeder 30 so that fuel is supplied from one unit cell 20 to the other in succession.

As the liquid fuel held in the fuel reservoir 10, a methanol solution consisting of methanol and water may be mentioned, but liquid fuel is not particularly limited as long as the hydrogen supplied to an aftermentioned fuel electrode element as the fuel can be split into hydrogen ions ($H^+$) and electrons ($e^-$). For example, a liquid fuel containing hydrogen sources such as dimethylether (DME, $CH_3OCH_3$) may be used though it depends on the fuel electrode structure. In the present embodiment, the liquid fuel is absorbed and retained by an occluding element 10a held in fuel reservoir 10, such as sliver, porous material, bundled fibers and the like. This occluding element 10a is not particularly limited as long as it can absorb and retain the liquid fuel, and may use the same configuration as the material for the fuel feeder 30, which will be described later.

The material for the fuel reservoir 10 is not particularly limited as long as it presents storage stability and durability against the fuel liquid stored therein. Examples include metals such as stainless steel, and synthetic resins such as polypropylene, polyethylene, polyethylene terephthalate (PET).

Each fuel cell unit 20 forming a unit cell includes a fuel electrode element 21 formed of a micro columnar carbon porous body having a passage hole 22 at the center thereof for allowing fuel feeder 30 to pass there through. Electrolyte layer 23 is formed on the outer surface of the fuel electrode element 21 and air electrode layer 24 is covered over the outer surface of the electrolyte layer 23. The electromotive force per each fuel cell unit 20 is about 1.2 V, in theory.

The micro columnar carbon porous body forming this fuel electrode element 21 maybe formed of a porous structure having fine interconnected pores, for example, in a three-dimensional mesh structure or in a point-sintered structure. The examples include carbon composite forming consisting of amorphous carbon and powdery carbon, isotropic high-density carbon forming, carbon fiber paper forming, activated carbon forming, and the like. Carbon composite forming having fine interconnected pores, made up of amorphous carbon and powdery carbon, is preferable in view of ease of reaction control at the fuel pole of the fuel cell as well as improvement of the reaction efficiency.

As the powdery carbon used to produce the carbon composite having the porous structure, at least one type (solo or two or more kinds), selected from the group of highly ordered pyrolytic graphite (HOPG), kish graphite, natural graphite, artificial graphite, carbon nanotubes and fullerenes, is preferred in view of further improvement of the reaction efficiency.

Formed on the outer surface of the fuel electrode element 21 is platinum-ruthenium (Pt—Ru) catalyst, iridium-ruthenium (Ir—Ru) catalyst, platinum-tin (Pt—Sn) catalyst, or the like, by the reduction process after immersion or impregnation with a solution containing micro metal particle precursors such as the metal ions, metal complexes, or by electrodeposition of micro metal particles.

As electrolyte layer 23, ion exchange membranes presenting proton conductivity or hydroxyl ion conductivity, e.g., fluorinated ion exchange membranes such as Nafion (a product of the Du Pont), may be used. Other than these, those having good heat resistance and beneficial reduction of methanol crossover, e.g., a composite membrane composed of an inorganic compound as the proton-conducting material and a polymer as the filming material, may be used. More specifically, composite membranes using zeolites as the inorganic compound and styrene-butadiene rubber as the polymer, hydrocarbonic grafted membranes, and others can be listed.

As air electrode layer 24, porous carbon bodies having a porous structure, deposited with platinum (Pt), palladium (Pd), rhodium (Rh) using a solution including the aforementioned metal particle precursors, can be used.

The fuel feeder 30 is not particularly limited as long as it is joined to occluding element 10a retaining the liquid fuel stored in fuel reservoir 10 and has an infiltration structure capable of supplying each unit cell 20 with the liquid fuel. The examples include: felt; porous materials presenting capillary force, formed of sponge or a sinter such as resin particle sinter, resin fabric sinter or the like; bundled fibers, selected from natural fibers, animal hair fibers, polyacetal resins, acrylic resins, polyester resins, polyamide resins, polyurethane resins, polyolefin resins, polyvinyl resins, polycarbonate resins, polyether resins, polyphenylene resins and combinations of these. The porosity or the like of these porous materials and bundled fibers is adjusted as appropriate depending the supplied amount of fuel to each unit cell 20.

Spent fuel reservoir 40 is arranged at the bottom of fuel feeder 30. An occluding element 41 formed of a porous material or bundled fibers for absorbing the spent fuel is put in the reservoir 40 and is joined to the terminal end of fuel feeder 30.

The liquid fuel supplied from fuel feeder 30 is used for reactions at fuel cell units 20. Since fuel is supplied in association with the consumed amount of fuel, almost no unreacted liquid fuel is discharged outside the battery. So no processing system is needed on the fuel discharge port side, which would be needed in the conventional liquid fuel cells. Even though, if an excess supply occurs in some operating states, the liquid fuel, unused for reactions, is stored in reservoir 40 so as to prevent reaction disturbance.

Designated at 50 is a member having a mesh configuration or the like for joining fuel reservoir 10 and spent fuel reservoir 40 and for establishing secured direct supply of liquid fuel by way of fuel feeder 30 to individual unit cells 20, 20.

The fuel cell A of the present embodiment is constructed so that the liquid fuel absorbed in occluding element 10a in fuel reservoir 10 is conducted by capillary action into fuel cell units 20, 20, by virtue of the infiltration structure of fuel feeder 30.

In the present embodiment, the magnitudes of capillarity of fuel reservoir 10 (occluding element 10a), fuel electrode element 21 and/or fuel feeder 30 adjoining fuel electrode element 21 and spent fuel reservoir 40 are selected so that fuel reservoir 10 (occluding element 10a)<fuel electrode element 21 and/or fuel feeder 30 adjoining fuel electrode element 21<spent fuel reservoir 40, whereby it is possible to feed liquid fuel directly from fuel reservoir 10 to individual unit cells 20, 20 in a stable and continuous manner without occurrence of either backward flow or break in flow even if the fuel cell A is put upside down or at other attitude (at any orientation).

In fuel cell A of the present embodiment, since the liquid fuel can be smoothly supplied in a direct manner without evaporation meaning that no auxiliary device such as pump, blower, fuel vaporizer, condenser or the like is needed, it is possible to make the fuel cell compact.

Further, in fuel cell A of the present embodiment, since fuel electrode element 21 formed of a microporous carbon material is, as a whole, excellent in conductivity and corrosion resistance and light in weight and is constructed so that the edge surfaces of the graphite structure which make catalytic reactions on the fuel pole side more active are selectively exposed, it is possible to provide a battery which can cause electrochemical reactions without, or with a lesser amount of, precious metal catalyst and which is free from aging degradation and variations in performance. Thus, it is possible to provide a compact cell presenting good battery performance.

In the present embodiment, since the magnitudes of capillarity of fuel reservoir 10, fuel electrode element 21 and/or fuel feeder 30 adjoining fuel electrode element 21 and spent fuel reservoir 40 are selected so that fuel reservoir 10 (occluding element 10a)<fuel electrode element 21 and/or fuel feeder 30 adjoining fuel electrode element 21<spent fuel reservoir 40, the fuel, i.e., the methanol solution as the fuel can be uniformly supplied to the fuel pole by capillary force.

Further, since fuel feeder 30 having an infiltration structure is directly joined to the end of fuel reservoir 10 to supply fuel to each of unit cells 20, 20, it is possible to achieve a compact fuel cell configuration made up of multiple cell units.

In this embodiment, since occluding element 10a for absorbing and holding liquid fuel is held in fuel reservoir 10, liquid fuel can be supplied in a stable manner while fuel recharge or replacement can be easily done by recharging liquid fuel from the top opening port of fuel reservoir 10 or by replacing occluding element 10a of sliver, porous material or the like. It should be noted that spent fuel reservoir 40 can be constructed so that occluding element 41 therein or spent fuel reservoir 40 that incorporates occluding element 41 as a whole is replaced.

The present embodiment has been described taking a configuration where two fuel cell units 20 are used, the number of fuel cell units 20 coupled (in series or parallel) may be increased depending on usage purpose of the fuel cell, to obtain a desired electromotive force, etc.

Accordingly, in fuel cell A of the present embodiment, it is possible to provide a compact direct methanol fuel cell which can be given in a cartridge form and can be used as the power source for portable electronic appliances such as cellular phones, laptop computers.

FIG. 2 shows a fuel cell B of the second embodiment of the present invention. In this embodiment, the same components and those having the same functions as in the first embodiment will be allotted with the same reference numerals as in FIGS. 1A to 1C and description is omitted.

As shown in FIG. 2, this fuel cell B is different from the above first embodiment, only in that liquid fuel in fuel reservoir 10 is stored in the free state and is supplied with the help of a collector element 11 arranged in the lower part of fuel reservoir 10 for storing liquid fuel.

Collector element 11 has the same configuration as that used in a free-ink writing instrument or the like, and prevents the liquid fuel stored in the free state in fuel reservoir 10 from flowing out in excess due to change in air pressure, temperature or other factors. That is, the liquid fuel flowing out in excess due to air expansion or the like can be retained within collector vanes 11a, 11a of collector element 11 and can return to fuel reservoir 10 when air pressure or temperature reverts back to the original state.

Since the thus constructed fuel cell B of the second embodiment is a combined structure of the fuel cell A of the first embodiment with collector 11, the same function and effect as in the first embodiment are obtained, and in addition the liquid fuel can be stably supplied to each unit cell 20 by the supply adjustment function of collector element 11 against change in temperature and air pressure.

FIGS. 3A and 3B show a fuel cell C of the third embodiment of the present invention.

As shown in FIGS. 3A and 3B, this fuel cell C is different from the above first embodiment, in that, liquid fuel in fuel reservoir 10 is stored in the free state, and that a second fuel reservoir 15 is provided under fuel reservoir 10 for storing liquid fuel with a valve element 12 in between, and that a porous material or bundled fibers for absorbing liquid fuel is incorporated in the second fuel reservoir 15, also that fuel feeder 30 is jointed to the porous material or bundled fibers held in the second fuel reservoir 15, and finally that unit cells 20 each have a flat structure and are arranged in layers.

In the thus constructed fuel cell C of the third embodiment, a pressing action (clicking action) onto fuel reservoir 10 causes valve element 12 to open and close. As fuel reservoir 10 is pushed (clicked) valve element 12 opens so that liquid fuel flows into second fuel reservoir 15 for temporal storage. Liquid fuel is thereby supplied to each unit cell 20 through fuel feeder 30. Thus, the same function and effect as in the first embodiment can be obtained.

Further, in the fuel cell C of the third embodiment, since a pressing action (clicking action) onto fuel reservoir 10 causes valve element 12 to open and close, to thereby activate the fuel cell function, it is possible to easily adjust the supplied amount of liquid fuel, the timing of start of use and the timing of cessation of usage (interruption).

Moreover, in the fuel cell C of the third embodiment, since unit cells 20 each have a flat structure and are arranged in layers, many unit cells 20 can be joined in series with respect to fuel supply, it is possible to provide a fuel cell having a high electromotive force.

FIGS. 4A to 4D show a fuel cell D of the fourth embodiment of the present invention.

Figure 4A:
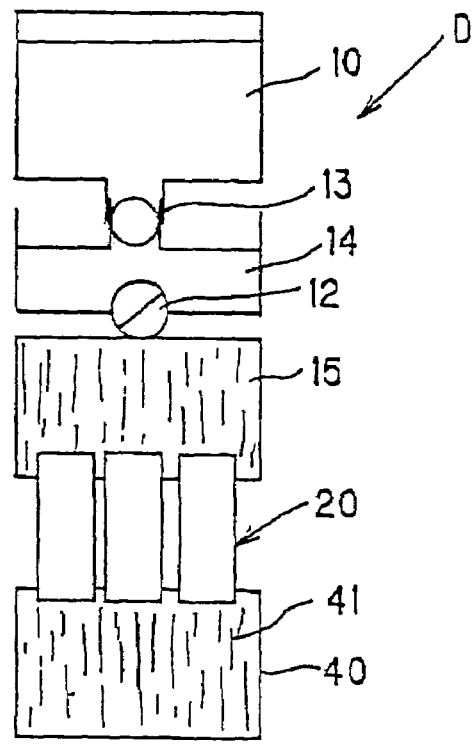
FIG. 4A is a schematic sectional view showing a vertical section of the fourth embodiment of the present invention.
Figure 4B:
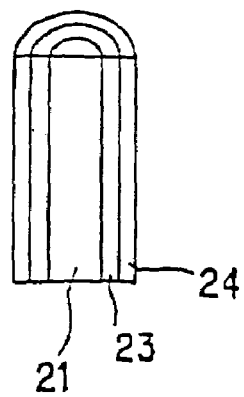
FIG. 4B is a partial vertical sectional view showing a unit fuel cell and FIGS. 4C and 4D respectively show partial vertical section and perspective view of a unit fuel cell of another configuration.

As shown in FIGS. 4A and 4B, this fuel cell D is different from the above first embodiment, in that, liquid fuel in fuel reservoir 10 is stored in the free state, and that fuel reservoir 10 for storing liquid fuel is given in a replaceable cartridge form, and in that the fuel supply system has a liquid fuel inflow tank 14 connected to an outflow valve 13 arranged at the bottom of fuel reservoir 10, also in that a second fuel reservoir 15 is provided under liquid fuel inflow tank 14 with a valve element 12 in between in addition that a porous material or bundled fibers for absorbing liquid fuel is incorporated in the second fuel reservoir 15, moreover that fuel electrode element 21 of each unit cell 20 itself is a porous body and also plays a role of fuel feeder 30, and finally that unit cells 20 are each connected in parallel to the others and coupled with the fuel supply.

Figure 4C:
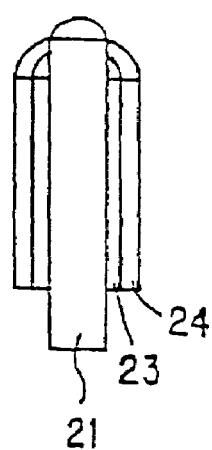
Figure 4D:
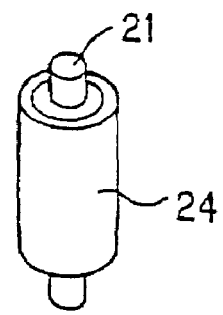

This unit cell 20 has a configuration shown in FIG. 4B. That is, fuel electrode element 21 in the center of the cylinder is formed of a porous material presenting equivalent capillarity to that of fuel feeder 30, so as to permit fuel to flow from second fuel reservoir 15 to spent fuel reservoir 40. The unit cell may also be formed with projected fuel electrode element 21 as shown in FIGS. 4C and 4D.

In the thus constructed fuel cell D of the fourth embodiment, a pressing action (clicking action) onto fuel reservoir 10 causes outflow valve 13 and valve element 12 to open and close. As fuel reservoir 10 is pushed (clicked) outflow valve 13 opens so that liquid fuel flows into liquid fuel inflow tank 14 and further goes into second fuel reservoir 15 for temporal storage through valve element 12 which opens at the same time. Liquid fuel is thereby supplied to each unit cell 20 through fuel electrode element 21. Thus, the same function and effect as in the first embodiment can be obtained.

Further, in the fuel cell D of the fourth embodiment, since fuel reservoir 10 is provided as a cartridge, fuel recharge and replacement can be easily made. Since a pressing action (clicking action) onto the fuel reservoir causes outflow valve 13 and valve element 12 to open and close, to thereby activate the fuel cell function, it is possible to easily adjust the timing of start of use and the timing of cessation of usage (interruption) and supply liquid fuel in a stable and continuous manner.

Moreover, in the fuel cell D of the fourth embodiment, since no fuel feeder 30 is needed because the fuel electrode element of each unit cell 20 is made of a porous structure this configuration enables provision of a fuel cell which is compact and also has unit cells improved in performance and efficiency.

Figure 5:
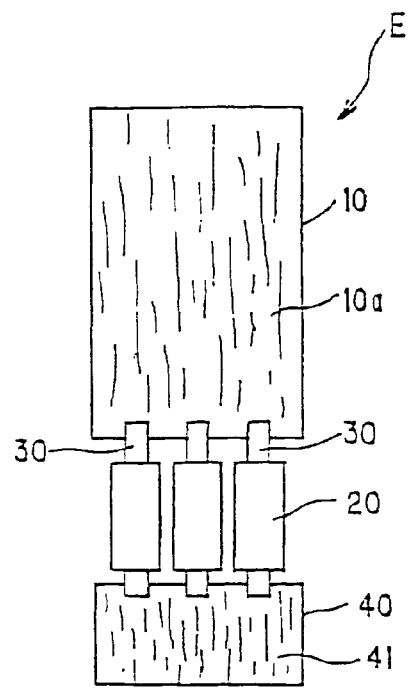
FIG. 5 is a schematic sectional view showing a vertical sectional view of the fifth embodiment of the present invention.

FIG. 5 shows a fuel cell E of the fifth embodiment of the present invention.

As shown in FIG. 5, this fuel cell E is different from the above first embodiment, only in that each unit cell 20 has an individual fuel feeder 30, and these fuel feeders 30 are connected in parallel to each other and coupled with the fuel supply.

In the fuel cell E of the fifth embodiment, since unit cells are connected in parallel, a large amount of fuel can be supplied at a time. Accordingly, it is possible to make control of electromotive force. In the present invention, it is also possible to make control based on the design of capillary forces.

FIGS. 6A to 6D each show a different joining structure and fuel supplying structure between a fuel feeder 30 and unit cells 20 in the fuel cell of the present invention. Though not illustrated, fuel reservoir 10 and spent fuel reservoir 40 are arranged at the top and bottom, respectively.

Figure 6A:
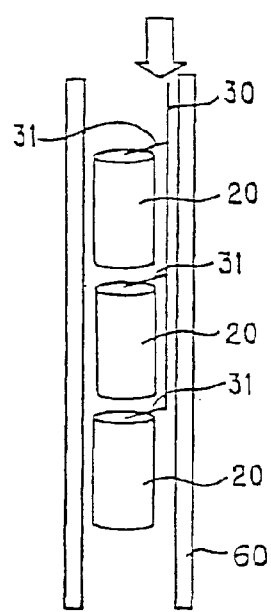
FIGS. 6A to 6D are schematic views of various fuel cell configurations of the present invention, each showing a different coupling structure and fuel supplying structure between a fuel feeder and unit cells.

FIG. 6A shows a configuration wherein fuel is supplied to columnar unit cells 20 arranged in a barrel 60, one to the next, by way of individual fuel feed branches 31, 31, . . . from a fuel feeder 30.

Figure 6B:
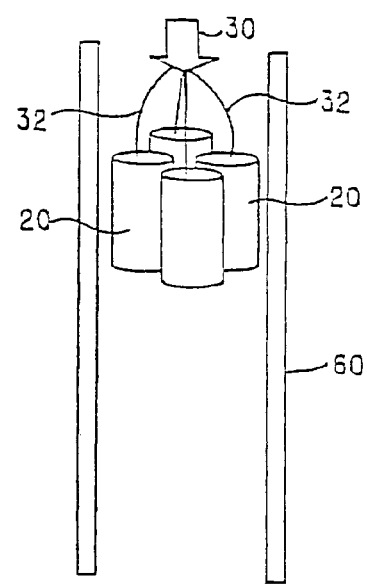

FIG. 6B shows a configuration wherein fuel is supplied to columnar unit cells 20 arranged in a barrel 60, at the same time, by way of individual fuel feed branches 31, 31, . . . from a fuel feeder 30.

Figure 6C:
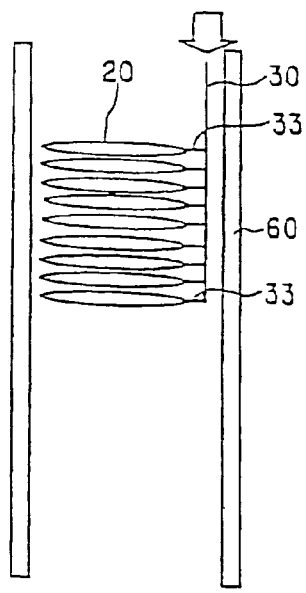

FIG. 6C shows a configuration wherein fuel is supplied to layered unit cells 20 arranged in a barrel 60, one to the next, by way of individual fuel feed branches 33, 33, . . . from a fuel feeder 30.

Figure 6D:
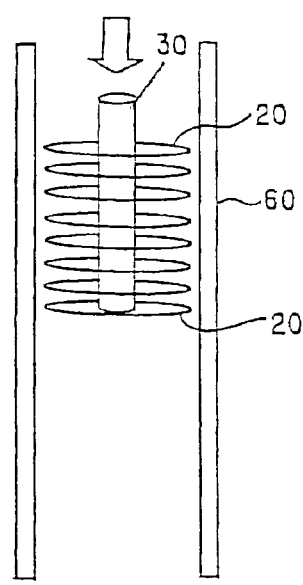

FIG. 6D shows a configuration wherein layered unit cells 20 are arranged in a barrel 60 and connected by a fuel feeder 30 that penetrates through the centers of layered unit cells 20 so as to supply fuel to the layered unit cells 20, one to the next, from the fuel feeder 30.

The fuel cell of the present invention is thus constructed and presents the function and effect as above, but the invention should not be limited to the above embodiments, and different embodiments of this invention can be made without departing from the spirit and scope thereof.

For example, the present invention may be achieved by a combination of the first to fifth embodiments. Specifically, a collector element may be provided for the second fuel reservoir 15 of the third embodiment (FIGS. 3A and 3B). The fuel reservoir 10 of the third embodiment (FIGS. 3A and 3B) may be replaced with a cartridge type structure of the fourth embodiment (FIGS. 4A to 4D). The unit cell in the fifth embodiment may be constructed in the same manner as the fourth embodiment, so as to omit the fuel feeder 30 in the fifth embodiment by making the fuel electrode element 21 serve therefor.

As has been described heretofore, according to the present invention, it is possible to provide a compact direct methanol fuel cell which can directly supply liquid fuel to the fuel electrode elements in a stable manner and is suitable for the power source to portable appliances such as cellular phones, laptop computers and the like.

According to the present invention, since the liquid fuel, unused for reactions, is stored in the reservoir when excess fuel is supplied in some operating states, it is possible to provide a direct methanol fuel cell which can prevent reaction disturbance.

Next, according to the present invention, it is possible to provide a direct methanol fuel cell which allows easy adjustment of the timing of start of use and the timing of cessation of usage (interruption) and which can supply liquid fuel in a stable and continuous manner.

According to the present invention, it is possible to provide a direct methanol fuel cell which can feed liquid fuel directly from the fuel reservoir to individual unit cells in a stable and continuous manner without occurrence of either backward flow, or break in flow even if the fuel cell is put upside down or at any other attitude (at any orientation).

According to the present invention, it is possible to provide a direct methanol fuel cell which is able to improve the efficiency of the reaction at the fuel electrode element of the fuel cell.

What is claimed is:

1. A direct methanol fuel cell including a multiple number of connected unit cells, each composed of a fuel electrode element of a microporous carbon material, an electrolyte layer formed on the outer surface of the fuel electrode element, an air electrode layer formed on the outer surface of the electrolyte layer,
   wherein the fuel cell further comprises: a fuel reservoir which stores at least a part of liquid fuel by an occluding element formed of a porous material and/or bundled fibers presenting capillarity;
   a fuel feeder having an infiltration structure; and
   a fuel supply system for supplying liquid fuel to the fuel reservoir includes a second fuel reservoir and a valve element configured to open and close by pressing the second fuel reservoir,
   wherein each unit cell is connected to the fuel feeder having the infiltration structure and coupled with the fuel reservoir for storing liquid fuel, so as to supply liquid fuel thereto,
   wherein the fuel electrode element and the fuel feeder adjoining the fuel electrode element are formed of a porous material and/or bundled fibers presenting capillarity.

2. The direct methanol fuel cell according to claim 1, wherein the terminal end of the fuel feeder is connected to a spent fuel reservoir.

3. The direct methanol fuel cell according to claim 1, wherein the fuel reservoir is constructed of a replaceable cartridge structure.

4. The direct methanol fuel cell according to claim 1, wherein the fuel electrode element provides the function of a fuel feeder.

5. The direct methanol fuel cell according to claim 2, wherein the fuel feeder is arranged from the fuel reservoir to the spent fuel reservoir, and the magnitudes of capillarity of the fuel reservoir, the fuel electrode element and/or fuel feeder adjoining the fuel electrode element and the spent fuel reservoir are selected so that the fuel reservoir<the fuel electrode element and/or fuel feeder adjoining the fuel electrode element<the spent fuel reservoir.

6. The direct methanol fuel cell according to claim 1, wherein the microporous carbon material is a carbon composite forming which is made up of amphorous carbon and powdery carbon, having micro continuous pores.

7. The direct methanol fuel cell according to claim 6, wherein the powdery carbon is composed of, at least, one selected from the group of highly ordered pyrolytic graphite (HOPG), kish graphite, natural graphite, artificial graphite, carbon nanotubes and fullerenes.

* * * * *